US010275731B2

(12) United States Patent
Hunt

(10) Patent No.: US 10,275,731 B2
(45) Date of Patent: Apr. 30, 2019

(54) MULTI-YEAR CROP YIELD ANALYSIS USING REMOTELY-SENSED IMAGERY FOR MISSING OR INCOMPLETE YIELD EVENTS FOR SITE-SPECIFIC VARIABLE RATE APPLICATIONS

(71) Applicant: AGRIAN, INC., Clovis, CA (US)

(72) Inventor: Aaron Dale Hunt, Bellefonte, PA (US)

(73) Assignee: AGRIAN, INC., Clovis, CA (US)

( * ) Notice: Subject to any disclaimer, the term of this patent is extended or adjusted under 35 U.S.C. 154(b) by 0 days.

(21) Appl. No.: 15/642,967

(22) Filed: Jul. 6, 2017

(65) Prior Publication Data

US 2018/0012168 A1    Jan. 11, 2018

Related U.S. Application Data

(60) Provisional application No. 62/358,637, filed on Jul. 6, 2016.

(51) Int. Cl.
| | |
|---|---|
| G06Q 10/06 | (2012.01) |
| G06Q 50/02 | (2012.01) |
| G06N 5/04 | (2006.01) |
| G06N 7/00 | (2006.01) |

(52) U.S. Cl.
CPC ....... *G06Q 10/06375* (2013.01); *G06Q 50/02* (2013.01); *G06N 5/045* (2013.01); *G06N 7/005* (2013.01); *Y02A 40/12* (2018.01)

(58) Field of Classification Search
CPC combination set(s) only.
See application file for complete search history.

(56) References Cited

U.S. PATENT DOCUMENTS

| 9,563,848 | B1 * | 2/2017 | Hunt | G06N 5/045 |
|---|---|---|---|---|
| 9,792,557 | B2 * | 10/2017 | Mathur | G06Q 50/02 |
| 9,959,507 | B2 * | 5/2018 | Mathur | G06Q 50/02 |
| 2014/0012732 | A1 | 1/2014 | Lindores | |
| 2015/0278640 | A1 | 10/2015 | Johnson et al. | |
| 2016/0180473 | A1 | 6/2016 | Groeneveld | |

* cited by examiner

Primary Examiner — Thai Q Phan
(74) Attorney, Agent, or Firm — Lazaris IP

(57) ABSTRACT

A multi-year yield analysis in precision agriculture characterizes variables affecting crop yield to enable site-specific prescription mapping for a bounded field. Remotely-sensed imagery of the bounded field is incorporated as a replacement for, or in addition to, one or more of coverage data, uniformity data, age data, and weather data that comprise variables in the multi-year yield analysis. The multi-year yield analysis enables recommendations for variable-rate applications to the bounded field such as seeding, fertilizing, and applying crop treatments.

20 Claims, 2 Drawing Sheets

MULTI-YEAR CROP YIELD ANALYSIS USING REMOTELY-SENSED IMAGERY FOR MISSING OR INCOMPLETE YIELD EVENTS FOR SITE-SPECIFIC VARIABLE RATE APPLICATIONS

CROSS-REFERENCE TO RELATED PATENT APPLICATION(S)

This patent application claims priority to U.S. provisional application 62/358,637, filed on Jul. 6, 2016, the contents of which are incorporated in their entirety herein. In accordance with 37 C.F.R. § 1.76, a claim of priority is included in an Application Data Sheet filed concurrently herewith.

FIELD OF THE INVENTION

The present invention relates to site-specific variable rate applications in precision agriculture. Specifically, the present invention relates to a system and method of performing a multi-year crop yield analysis to generate prescription maps for variable rate applications in a field, using remotely-sensed imagery as a replacement for, or instead of, yield event information for a bounded field.

BACKGROUND OF THE INVENTION

Crop advisors, growers, and other responsible entities have a need for creating variable rate applications for crops and fields, such as for example seeding, irrigation, and crop and soil treatment events. Growers engage crop advisors and/or access automated processes for decision-making or recommendation-writing to help define a set of management zones for these seeding events in a particular field. The crop advisor seeks to define these zones for a variable rate seeding application based on a set of logged crop yield data. This is used to create area views of a field with similar patterns.

This is accomplished using a multi-year yield analysis of selected crop yield data, in which one or more variables that influence or affect crop yield are evaluated. This multi-year yield analysis allows for the creation and definition of the management zones, and the writing of recommendations, for a particular field using such an evaluation of crop yield across multiple layers, or years, of event information. This approach may be accomplished in either a weighted analysis or a non-weighted analysis of the one or more variables.

However, there may not be sufficient yield events to produce accurate results using this approach. This could be due to a number of factors. For example, the crop advisor (or automated decision-making or recommendation-making process) may only have the last few years of yield data (or even less, for example only the last year) on the field. Particular yield event(s) may also be missing from the field history. Additionally, there may be no yield data for the particular field at all. Accordingly there is a need in the art for an approach that substitutes or replaces missing, logged yield event with representative data that approximates a yield event(s) for such a multi-year yield analysis.

BRIEF SUMMARY OF THE INVENTION

It is one objective of the present invention to provide a system and method of performing a multi-year crop yield analysis for site-specific prescription mapping and recommendation writing for variable rate applications. It is another objective of the present invention to provide an approach for replacing or filling in for missing or incomplete yield event information for such a multi-year crop yield analysis using remotely-sensed imagery of the bounded field. It is still another objective of the present invention to identify and normalize one or more variables that represent yield events from remotely-sensed imagery of a bounded field for a multi-year crop yield analysis. It is yet another objective to determine weightings for the one or more variables identified from remotely-sensed imagery.

The present invention is an approach to evaluating crop yield event information for agricultural implementations. The present invention performs a multi-year crop yield analytical framework and process that incorporates data in one or more images from remotely-sensed imagery of a particular field as substitute for yield event variables, across multiple years of crop data, and generates yield analytics that are used for follow-on agricultural planning and activity. The present invention enables site-specific prescription mapping and recommendation writing for variable rate applications for this agricultural planning and activity. Remotely-sensed imagery may be used in lieu of, or in addition to, actual logged crop yield data in such a multi-year crop yield analysis. The crop advisor (or automated process) may therefore use data determined from the one or more images to fill in a more complete history for the particular field, and have more confidence in the analysis and any resulting products, where yield event information is missing, unavailable, incomplete, or unreliable.

Where yield event information is incomplete, it should be noted that the present invention contemplates that imagery may be used to fill in gaps for a particular year t. It should be further understood that yield event information representing just a portion of a year t may be used to calibrate the use of imagery to fill in missing or incomplete information.

Imagery representing a field for analysis of crop yield therein may be acquired from many different sources. These sources include, but are not limited to, satellites, aircraft (including both manned and unmanned/remotely-piloted vehicles (commonly referred to as drones)), or sensors that are either positioned in-field, proximate to a field, or mounted on equipment or machines. Any of these sources may provide potential information for a source layer for replacing a yield event(s).

In one aspect, the present invention is a method comprising receiving, as input data, remotely-sensed imagery data representing one or more portions of a bounded field; analyzing the input data in one or more data processing modules within a computing environment in which the plurality of data processing modules are executed in conjunction with at least one processor, the one or more data processing modules configured to initialize one or more recommendations for a variable rate application for the bounded field based on a multi-year yield analysis of yield event information derived from the remotely-sensed imagery data, the multi-year yield analysis performed by 1) selecting one or more images from the remotely-sensed imagery data that represents a crop for which yield event information is sought in the bounded field, 2) selecting an appropriate vegetation index based at least on the crop for which yield event information is sought, 3) applying the vegetation index to the one or more images to analyze at least one vegetation property of the crop and generate a yield profile representing a yield approximation for the crop, 4) normalizing the yield profile to represent at least one of a percentage of the bounded field that is covered by crop as yield coverage data, and a variation factor in a crop yield across the bounded field as yield uniformity data, and 5)

combining the assigned weights for each of the normalized coverage data and the normalized uniformity data into a single weighted value representing the yield event information. The method also comprises generating, as output data, one or more site-specific prescription maps of crop yield in the bounded field based on the multi-year yield analysis.

In another aspect, the present invention is a system comprising a computing environment including at least one non-transitory computer-readable storage medium having program instructions stored therein and a computer processor operable to execute the program instructions to initialize one or more recommendations for a variable rate application for a bounded field based on a multi-year yield analysis of yield event information derived from remotely-sensed imagery data within one or more data processing modules, the one or more data processing modules including an image selection component configured to select one or more images from the remotely-sensed imagery data that represents a crop for which yield event information is sought in the bounded field, a vegetation evaluation component configured to select an appropriate vegetation index based at least on the crop for which yield event information is sought, and apply the vegetation index to the selected one or more images to analyze at least one vegetation property of the crop and generate a yield profile representing a yield approximation for the crop, a data conversion component configured to a) normalize the yield profile to represent at least one of a percentage of the bounded field that is covered by crop as yield coverage data, and a variation factor in a crop yield across the bounded field as yield uniformity data, b) assign weights for the at least one of the normalized coverage data and for the normalized uniformity data, c) combine each assigned weight into a single weighted value representing the extracted yield event information, and d) assign a further weight to the at least one of the normalized coverage data and the normalized uniformity data based on a specific image in the one or more images from which the yield profile was generated, and a mapping component configured to generate one or more site-specific prescription maps of crop yield in the bounded field.

In yet another aspect, the present invention is a method of performing a multi-year yield analysis in precision agriculture, comprising retrieving and initializing a plurality of input data, the plurality of input data including remotely-sensed imagery data representing one or more portions of a bounded field; identifying one or more images from the remotely-sensed imagery data that represents a crop for which yield event information is sought in the bounded field; deriving a yield profile representing a yield approximation for the bounded field by analyzing the one or more images using at least one vegetation index selected based on one or more vegetation properties of the crop for which the yield event information is sought; normalizing the yield profile to represent a percentage of the bounded field that is covered by crop as yield coverage data, and a variation factor in a crop yield across the bounded field as yield uniformity data; and calculating a weight for each of the yield coverage data and the yield uniformity data, the weight of the yield coverage data representing decay at a rate beginning at a 90% coverage factor and approaching zero at a point between a 35% to 65% coverage factor, and the weight of the yield uniformity data representing decay at a linear rate starting between at an 80% uniformity factor and approaching zero at a 10% uniformity factor.

Other objects, embodiments, aspects, features, and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWING

The accompanying drawing, which is incorporated in and constitutes a part of this specification, illustrates several embodiments of the invention and together with the description, serves to explain the principles of the invention.

DETAILED DESCRIPTION OF THE INVENTION

Figure 1:
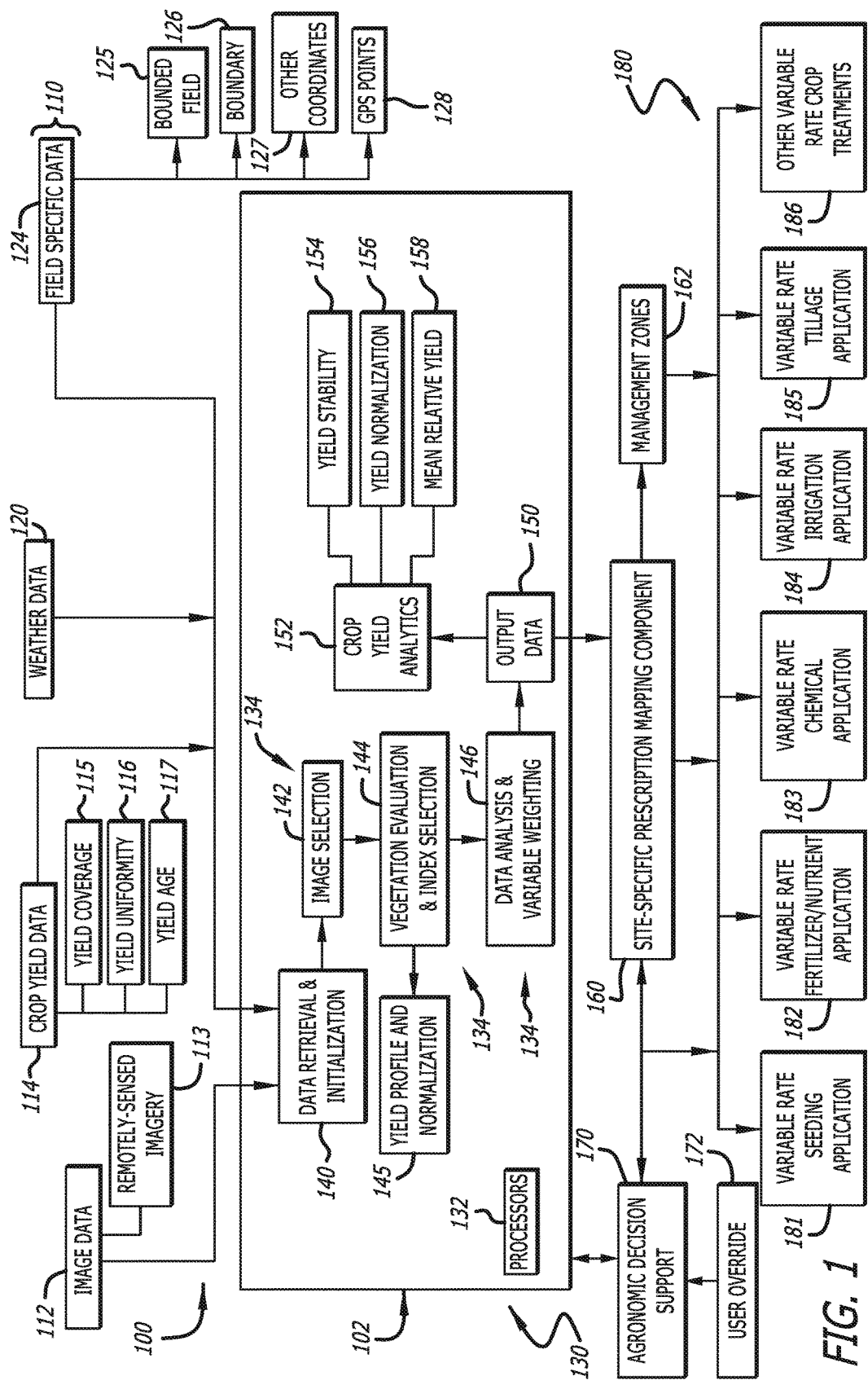
FIG. 1 is a block diagram of components of a multi-year crop yield evaluation framework according to one aspect of the present invention.

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention provides a framework 100 for performing a multi-year crop yield analysis 102 that evaluates input data 110 related to one or more variables in yield event information representing a crop yield for a bounded field. These variables include one or more layers of yield event information representing crop yield over multiple years or growing seasons. Yield event information may be comprised of different components of a crop yield or characteristics that influence crop yield, such as for example yield coverage data 115, yield uniformity data 116, yield age data 117, and weather data 120.

One or more of these different components or characteristics may be missing or incomplete, however, and the present invention contemplates that remotely-sensed imagery 113 comprising image data 112 of a bounded field 125 may be analyzed to fill in or replace the missing/incomplete information. Therefore, in order to perform a more accurate multi-year crop yield analysis 102, the crop advisor is able to incorporate remotely-sensed imagery 113 in image data 112 in place of yield event(s) that are not available. In this way, a more complete history of the bounded field 125 can be filled in, for a greater level of confidence in the analysis and any resulting products.

FIG. 1 is a system diagram illustrating block elements of a multi-year crop yield evaluation framework 100, according to the present invention. The multi-year crop yield evaluation framework 100 is performed within one or more systems and/or methods that includes several components, each of which define distinct activities for analyzing variables related to a crop yield 114 in a particular bounded field 125. The multi-year crop yield evaluation framework 100 is performed, in one embodiment of the present invention, to prepare site-specific prescription mapping 160 that enables crop advisors (or other user or automated process) to define management zones 162 and determine variable rate applications 180 for one or more crops planted or to be planted in the bounded field 125.

The multi-year crop yield analytical framework 100 ingests, receives, requests, or otherwise obtains input data 110 that includes remotely-sensed imagery 113 in image data 112, from which information about crop yield 114 in a bounded field 125 for one or more crops is at least in part derived. In the present invention, one or more layers of yield event information representing crop yield 114 over multiple years or growing seasons are extracted from the remotely-sensed imagery 113 in image data 112. Yield event information extracted from the remotely-sensed imagery 113 may be comprised of several variables, and may include different components of a crop yield 114 or characteristics that influence crop yield 114, such as for example yield coverage data 115, yield uniformity data 116, and yield age data 117. Yield coverage data 115 represents a percentage of the bounded field 125 that is covered by crop, and yield uniformity data 116 represents a variation factor in a crop yield 114 across the bounded field 125. Age data 117 is the number of years since a yield event or the amount of time that a crop output has been available.

Image data 112 may take many forms, such as for example field-level and remotely-sensed imagery 113 representing crop conditions in the bounded field 125. Sources of such image data 112 include satellite systems, unmanned aerial/remotely-piloted vehicles, manned aerial reconnaissance craft, and imaging equipment associated with field and farm equipment. Similar to weather data 120, the image data 112 may include information taken at multiple times throughout a growing season or the particular year of layered event information, and may alternatively represent the particular year of layered event information as a whole.

Input data 110 may also include, as noted above, weather data 120 and field data 124. Weather data 120 may be comprised of multiple values representing weather conditions in the bounded field 125, and may include a temperature value, and a precipitation value, and other values for additional weather conditions. Different values of weather data 120 may be applied for times throughout a growing season or the particular year of layered event information. Weather data 120 may alternatively represent the particular year of layered event information as a whole. Regardless, weather data 120 may include historical climatological and meteorological data obtained from many different sources, such as one or more weather-related database collections maintaining information collected, for example, from remotely-sensed and/or in-field observation platforms and weather satellites.

Field-specific data 124 may comprise information defining a field boundary 126 or other coordinates 127 of the bounded field 125. Regardless, it is to be noted that the geographical location of the bounded field 125 may be derived from the data defining a field boundary 126 or other coordinates 127, and that these may be represented in one or more GPS data points 128. The multi-year crop yield evaluation framework 100 may include a Global Positioning System (GPS), having components such as a GPS-enabled receiver, which detects signals relative to the bounded field 125 and receives the one or more GPS data points 128 to compute the field's precise position on Earth (or, a desired portion thereof). The GPS-enabled receiver may thereby extract and determine the geographical location of the field 125, or relevant sections of the field 125, from the field boundary 126 and/or other coordinates 127 in the GPS data points 128. Field-specific data 124 may be used to access applicable input data 110, such as weather data 120 for a particular geographical location that includes the bounded field 125, for specific crop data planted at a particular location in a field 125, and for presenting the site-specific prescription mapping 160 discussed further herein.

The input data 110 is applied to a plurality of data processing components 134 for a multi-year crop yield analysis 102 using, at least in part, imagery 113 in image data 112, and a site-specific prescription mapping function 160, within a computing environment 130. The computing environment 130 also includes one or more processors 132, a plurality of software and hardware components, and one or more modular software and hardware packages configured to perform specific processing functions. The one or more processors 132, plurality of software and hardware components, and one or more modular software and hardware packages are configured to execute program instructions to perform algorithms for various functions within the multi-year crop yield evaluation framework 100 that are described in detail herein, and embodied in the one or more data processing components 134. It is to be understood that the information comprising the input data 110 may be stored or maintained on, and/or pulled from, a plurality of different servers, and that not all data may be contained within any one server environment. Similarly, various information in the input data 110 may be proprietary or obtained one or more third parties.

The one or more data processing components 134 may include a data retrieval and recommendation initialization component 140 that is configured to obtain and distribute the input data 110 for the various other functions within the multi-year crop yield analysis 102 and site-specific prescription mapping 160. The data retrieval and recommendation initialization component 140 is also configured to arrange and/or parse the input data 110 for the multi-year crop yield evaluation framework 100, and initialize the overall process that results in writing the one or more variable rate application recommendations 180. The one or more data processing components 134 may also include an image selection component 142, a vegetation evaluation and index selection component 144 that is configured to generate and normalize a yield profile 145, and data analysis and variable weighting component 146. Together, the components are configured to generate output data 150 as described further herein.

The data analysis and variable weighting component 146 of the multi-year crop yield evaluation framework 100 is configured to further process input data 110 by calculating and assigning weights for evaluating the one or more variables representing the yield event information that are obtained from the image data 112. It is important to note, however, that replacement data derived from image data 112 may be used in both a basic non-weighted multi-year analysis, and in a more advanced weighted analysis as set forth below.

Other crop-specific variables related to crop yield 114 are also possible, and therefore it is to be understood that the present invention contemplates that many other variables may comprise the input data 110 in addition to, or in place of, variables such as yield coverage data 115, yield uniformity data 116, and yield age data 117. Likewise, it is to be understood that weights may be calculated and assigned to each of these variables, using many different mathematical formulas and analytical processes. Examples of such additional crop-specific variables include density data that reflects crop or seed characteristics such as plant population, row spacing, crop planting depth, root zone penetration, and seed population. Other possible variables include elevation, the amount and rate of artificial precipitation applied, an amount time to maturity or harvest, length of a growing season, and the actual yield itself. Still other variables include crop canopy and soil conditions such as crop moisture, crop temperature, soil moisture, and soil temperature.

Regardless of the variable to be replaced, imagery 113 in image data 112 is contemplated as a direct replacement for the yield event variables for coverage and uniformity used in the multi-year crop yield evaluation framework 100. The present invention uses this image data 112 as a replacement for one or both of coverage and uniformity data by first finding the image or scene that best represents the crop for which yield data 114 is sought in the image selection component 142. The present invention then determines and identifies yield data 114 by selecting and applying a vegetation index to the image (such as for example a Normalized Difference Vegetation Index, or NDVI) in the vegetation evaluation and index selection 144 to obtain a yield profile 145 representing a yield approximation for the particular bounded field 125 based on at least one vegetation property, and normalizing the outcome to obtain the desired variable of yield event information. In this manner, layered data is derived from imagery data 112 and represents an interpolated crop yield. The present invention may then perform the calculations and comparisons performed on the layer that are described further herein, as if it were actual yield data for that layer or crop year.

As noted above, imagery 113 and image data 112 may be provided, requested, ingested, or otherwise acquired or obtained from many different sources. Examples of these sources include satellite systems and aircraft (either manned or unmanned/remotely-piloted flight vehicles). Other sources include sensors, such as those mounted on-board flight vehicles or farm equipment, or even in-field sensors capable of generating field-level imagery. Sources of image data 112 may be both public (governmental) and private. More specific examples include imagery obtained by manned aerial reconnaissance, as fine temporal resolution low-earth orbit satellites, field-based robots, and sensors mounted on field and farm equipment.

Image data 112 may therefore be considered as either remotely-sensed, or provided from direct observations of the bounded field 125. Regardless, the information in such image data 112 may be field-level and either raw or processed, and any of source of image data 112 may provide information sufficient to determine and identify at least coverage data and uniformity data for replacing missing or incomplete crop yield information in the bounded field 125. It is also contemplated that image data 112 may be captured by many different sources and combined to arrive at data sufficient to replace or fill in yield event information. It is additionally contemplated that remotely-sensed imagery 113 may be analyzed prior to or in conjunction with the modeling paradigms discussed herein for extracting and identifying variables representative of crop yield 114. Imagery 113 may be analyzed, for example, using a normalized difference vegetative index (NDVI) or other approach as noted below that provides information from which at least yield approximation, coverage and/or uniformity data can be determined for a crop in the bounded field 125. Imagery 113 may include information taken at multiple times throughout a growing season or the particular year of layered event information, and may alternatively represent the particular year of layered event information as a whole.

It is to be understood that the image data 112, as well as information extracted from imagery 113 contained in such image data 112 and representing one or more variables (as well as other input data 110) may be stored or maintained on, and/or pulled from, a plurality of different servers, and that not all data may be contained within any one server environment. Similarly, various information in the input data 110 and the image data 112 may be proprietary or obtained one or more third parties.

When the grower or crop advisor decides to perform a multi-year crop yield analysis 102 and utilize image data 112 collected from imagery 113 of a bounded field 125 (for example, by initializing an imagery replacement option using an agronomic decision support tool 170), the present invention automatically selects the best available imagery 113 of the bounded field 125 to use. This selection may be made using logic that first checks that the crop for the yield event that needs a replacement is approved for use, and that image data 112 is a viable replacement. Such a check ensures that imagery 113 is valid for the multi-year crop yield analysis 102 to be performed, as not all crops have a direct relationship between yield and imagery. It should be noted that a user may also manually select one or more imagery layers, in addition to auto-selection of the best available imagery 113 as noted above.

The present invention also enables selection of the optimal time of interest (TOI) date based on the selected crop, and the geography, for the missing or incomplete yield event to target the optimal crop stage for imagery correlation. This TOI selection may also be made by using the planting date and a crop development model to refine the TOI selection. The TOI selection, as well as other aspects of the multi-year crop yield analysis 102 that are capable of user modification within the multi-year crop yield evaluation framework 100, may be made using the agronomic decision support tool 170.

The present invention may be configured to automatically search for all imagery sources for views of the bounded field 125 within the time of interest. This includes any imagery services and user-uploaded sources. The present invention then reviews the selected imagery 113 and prioritizes the views, based on one or more of a timing closest to the optimal TOI, resolution, cloud cover, irrigation event(s), weather at the time of collection of the image data 112, coverage, and any other relevant characteristics.

Figure 2:
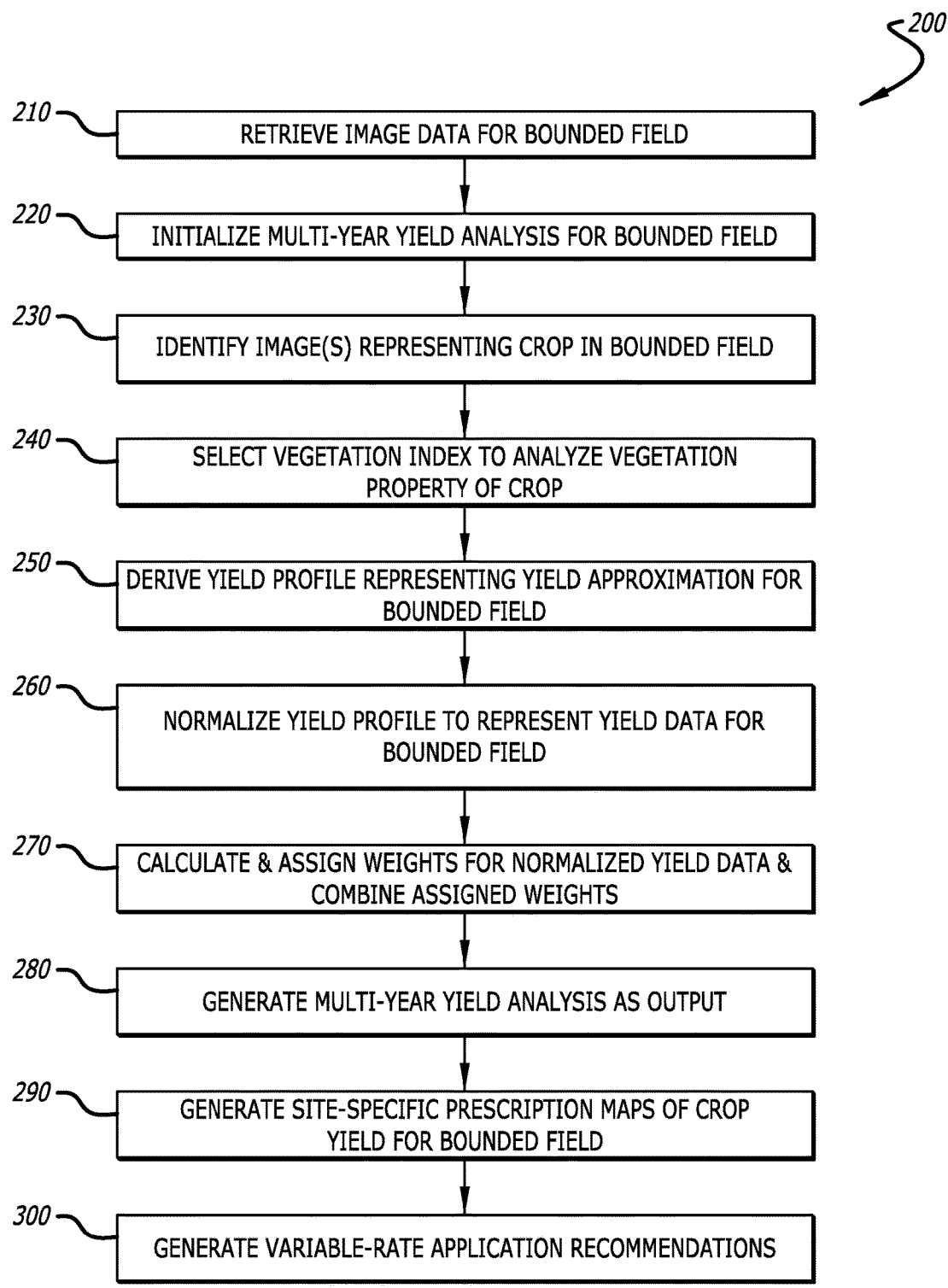
FIG. 2 is a diagram of a process of performing a multi-year crop yield analysis using remotely-sensed imagery data in place of yield event(s) according to another aspect of the present invention.

FIG. 2 is a diagram of a process 200 of evaluating multiple layers of crop yield data 114 using image data 112 as a replacement for missing or incomplete information, according to one embodiment of the present invention. The process 200 begins by retrieving, at step 210, image data 112 for a selected, bounded field 125. Depending on the type of crop evaluation needed, a user of the process 200 may specify both the layers and variables of the input data 110 that are to be replaced to the process 200, and may further specify coordinates of one or more bounded fields 125. The user may therefore customize the process 200, for example using the agronomic decision support tool 170 as noted herein.

The process 200 initializes, at step 220, the multi-year crop yield analysis 102 for the bounded field 125, and the input data 110 may be parsed at this stage for the specific analytical components applied in the process 200 and the multi-year crop yield evaluation framework 100 as indicated in FIG. 1. The process 200 continues with identifying images representing a crop in a bounded field 125, and selecting one or more images of the bounded field 125 from those identified that best represent the yield information that is missing or incomplete at step 230.

The process 200 continues by selecting an appropriate vegetation index to apply to the selected images from the image data 112 at step 240. The process 200 then derives, at step 250, a yield profile 145 representing a yield approximation for the bounded field 125, and normalizes the yield profile 145 to represent specific yield data 114 for the bounded field 125 at step 260.

At step 270, the process 200 calculates and assigns weights to the normalized yield event data 114. As noted above, many variables or types of yield event data 114 may be represented in the yield profile 145, such as for example yield coverage data 115 representing a percentage that the bounded field 125 is covered. While this may be based, for example, on an exponential decay rate of the yield coverage data 115, is to be understood that other methods of calculating and assigning a weight for yield coverage data 115 may be utilized, and that these methods may be used singularly or in combination to arrive at the weight to be assigned in step 270.

Weights for other variables may also be calculated and assigned at step 270. For example, the process 200 may calculate and assign a weight to yield uniformity data 116, representing as noted above a crop yield variation in the bounded field 125. Calculating and assigning a weight to this type of yield event data in step 270 may be based on a linear decay rate of the yield uniformity data 116. It is to be understood however that other methods of calculating and assigning a weight for yield uniformity data 116 may be utilized, and that these methods may be used singularly or in combination to arrive at the weight to be assigned in step 270.

The process 200 may also calculate and assign a weight to yield age data 117, representing for example the number of years since occurrence of a yield event in the bounded field 125, or the quality of the product data available. Calculating and assigning a weight to age data 117 in step 270 may be based on an age of collection for the yield event, derived from when imagery 113 in the image data 112 of the bounded field 125 was taken. For example, where an age of imagery 113 indicates that a total number of yield events exceeds a specified number of years, a lower weight is applied to this variable. In this manner, older yield data is discounted at a particular rate, while data derived from more recent collections of image data 112 is assigned a higher weight. It should be noted that the weight assigned for age data 117 may also be dependent on several additional factors, such as the type of crop planted and/or the product harvested, and conditions experienced in the field in the year of planting and harvest, such as for example weather conditions, soil characteristics, and pest and disease occurrence. Regardless, it is to be understood that other methods of calculating and assigning a weight for yield age data 117 may be utilized, and that these methods may be used singularly or in combination to arrive at the weight to be assigned in step 270.

The process 200 may also calculate and assign weights to other input data 110, such as weather data 120 for the bounded field 125. Weather data 120 may include a plurality of variables as noted, such as temperature, precipitation, humidity, and other values. Calculating and assigning a weight for this input data 110 may be based on a deviation factor of one or more of temperature, precipitation, and other information from expected or normal values. Also, multiple weights may be calculated, depending on the number of variables within the weather data 120.

These expected or normal values, as with age data 117, may be dependent on a number of other factors, such as the type of crop planted and/or product harvested. For example, if the yield data 114 is related to a crop that is capable of withstanding a wider temperature range, a different weight may be assigned than for a crop that is more sensitive to temperature variation. Similarly, if the yield data 114 is related to a crop that requires less water, a different weight may be assigned than for a crop that requires more water. The same is true for soil conditions in the bounded field 125, so that weights calculated and assigned for the weather data 120 may vary depending on soil conditions in the bounded field 125, as different types of soil, and the various contents and characteristics of soil, may result in crop yields with different temperature and precipitation variances. Soils may have markedly different characteristics in different parts of the same bounded field 125 as well, and it is to be understood the weights calculated and assigned to weather data 120 may further take this into account.

As noted above, weights for weather data 120 (and for uniformity, coverage, and age data) may also assigned according to a variety, cultivar or hybrid of a planted crop. In this manner, weightings may be influence and refined by specifics of the crop, so that a different weighting may result where a certain variation was planted in particular weather conditions. Weightings based on crop variations may therefore result in a weighting-of-weightings approach, in which a weight representing a combination of other weightings is applied, that produces a highly refined analysis of the crop yield based on specific characteristics of the crop. It should be noted that weights may be further refined by other crop-specific variables, such as where a particular nutrient or chemical was applied to mitigate a known pest or disease threat. Many other such considerations are possible when assigning weights in the present invention.

At step 270, the present invention may also calculate a combined weight from the weights assigned to each variable normalized from the yield profile 145 to obtain an overall weighted value. This overall value may be a weighted average of the various weights assigned, or may be calculated using one or more statistical probability models and other processes derived from mathematical formulas and analytical functions. Regardless, it is contemplated that a single combined weight is generated and applied for the multi-year crop yield analysis 102, which is generated at step 280 as output data 150 representing the modeled crop yield for further analysis in the process 200.

At step 290, the present invention applies the output data 150 to generate site-specific prescription maps 160 of crop yield for the bounded field 125. These prescriptions maps 160 may be visualized in a number of different ways as suggested above, for any part, or all of, a bounded field 125. Regardless, the site-specific prescription maps 160 are used to generate variable rate application recommendations 180 for the bounded field 125 at step 300. These include seeding, fertilizer, nutrient, irrigation, chemical, equipment usage, tillage, and any other agricultural application for a bounded field 125.

As also noted above, one approach to extracting the necessary yield information from image data 112 in the multi-year crop yield evaluation framework 100 is to apply a vegetation index, such as a Normalized Difference Vegetation Index (NDVI), to analyze vegetation properties contained in images of a particular bounded field 125. It is to be understood that many indices are contemplated instead of, or in addition to, the NDVI index specifically mentioned above, and therefore the present invention is not intended to be limited to any one approach mentioned herein. General examples of other indices include a Green Normalized Difference Vegetation Index (GNDVI), a Red Normalized Difference Vegetation Index (RNDVI), and an infrared index.

The vegetation evaluation and index selection component 144 is configured to evaluate the selected images from the image data 112 representing the bounded field 125 and select an index which most appropriate describes the vegetation properties in the bounded field 125. The vegetation evaluation and index selection component 144 may also consider the type of crop and other crop and planting information, as well as other data such as soil data, and therefore many factors may influence the selection of an appropriate vegetation index in the multi-year crop yield evaluation framework 100.

It is to be understood that the type of crop (and possibly other characteristics of field activity, such as crop and plant growth, pest or disease infestation, irrigation, and field equipment activity) may influence the type of index applied to the imagery 113 in image data 112, as yield data for some crops may be better expressed using particular indexes, in particular those applied to images captured by multispectral sensors. The vegetation index applied to the imagery 113 may also depend on the quality of the image data 112 available for the image scene to be analyzed. GPS coordinates may also be integrated to further specify a portion or portions of the imagery 113 used as a replacement for crop yield data 114, and it is therefore contemplated that the present invention may include a GPS receiver or other hardware configured to extract GPS data points 128 from imagery 113, and correlate these to both a portion of the field 125 to be analyzed, as well as to the type of crop analyzed and the appropriate vegetation index utilized to extract and identify yield information.

Vegetation indices are mathematical representations of combinations of surface reflectance at two or more wavelengths designed to highlight a particular property of vegetation. There are many such indices, and they are derived using the reflectance properties of vegetation. Each vegetation index is designed to accentuate a particular vegetation property. Accordingly, other relevant data crop and planting information such as for example planting data and crop growth stage, and weather information, may be useful in selecting the most appropriate vegetation index for analysis of imagery 113.

Indices are grouped into categories that calculate similar vegetation properties. The categories and indices include one representing broadband greenness, which is comprised of a Normalized Difference Vegetation Index, a Simple Ratio Index, an Enhanced Vegetation Index, an Atmospherically Resistant Vegetation Index, and a Sum Green Index.

Another category represents narrowband greenness, and is comprised of a Red Edge Normalized Difference Vegetation Index, a Modified Red Edge Simple Ratio Index, a Modified Red Edge Normalized Difference Vegetation Index, several variations of a Vogelmann Red Edge Index (1, 2 and 3), and Red Edge Position Index.

Another category examines light use efficiency, and is comprised of a Photochemical Reflectance Index, a Structure Insensitive Pigment Index, and Red Green Ratio Index. Yet another index examines canopy nitrogen, and is performed using a Normalized Difference Nitrogen Index.

Still another category evaluates dry or senescent carbon in vegetation. This category includes a Normalized Difference Lignin Index, a Cellulose Absorption Index, and a Plant Senescence Reflectance Index. A further category evaluates leaf pigment, and is comprised of Carotenoid Reflectance Indices 1 and 2, and Anthocyanin Reflectance Indices 1 and 2. Still a further category evaluates canopy water content, and is comprised of a Water Band Index, a Normalized Difference Water Index, a Moisture Stress Index, and a Normalized Difference Infrared Index.

Therefore, it is contemplated that the present invention may include determining the amount of surface reflectance in the image data 112, and incorporating a comparison with available crop and planting data and/or weather data 120 (and any other relevant information) to select an index appropriate for the particular vegetation characteristics at the time the source imagery was taken, as well the surface reflectance properties at that time.

The multi-year crop yield evaluation framework 100 of the present invention is configured to process images in the image data 112 (and any other available input data 110) by, in one aspect, performing various mathematical functions on layered yield event information representing crop yield 114 extracted from such image data 112 (in the image selection component 142 and the vegetation evaluation and index selection component 144), as well as calculating and assigning weights for the one or more variables comprising the layered yield event information in the data analysis and variable weighting component 146. These mathematical functions within the multi-year crop yield evaluation framework 100 may include a coverage decay analysis to evaluate decay of yield coverage data 115 obtained from the imagery 113 in image data 112. Yield coverage data 115 may be decayed at either a uniform or non-uniform decay rate. For example, decay may be weighted based on exponential decay, quadratic decay, logarithmic decay, or square rate decay, and may be either linear or non-linear. In one embodiment, and by way of further example, yield coverage data 115 is decayed at an exponential rate beginning at a 90% coverage factor and approaching zero at a selected point between a 35% to a 65% coverage factor. Such a point may be a mid-point value between the 35% and 65% coverage factors. In another example, the point is at a 50% coverage factor. It is to be understood that the point may be selected based on any number of factors. Regardless, based on this decay analysis, a weight is calculated and assigned to the normalized yield coverage data 115 that is identified from the image data 112.

The multi-year crop yield evaluation framework 100 may also include a uniformity decay analysis to evaluate decay of uniformity data 116 obtained from the image data 112. In one embodiment, yield uniformity data 116 is decayed at a linear rate starting between at an 80% uniformity factor and approaching zero at a 10% uniformity factor. Based on this decay analysis, a weight is calculated and assigned to the normalized yield uniformity data 116 to account for crop yield variation in the overall yield analysis.

The multi-year crop yield evaluation framework 100 may further include a crop yield age analysis to evaluate yield age data 117 by calculating and assigning a weight based on a collected age of the yield event. For example, where a total number of yield events exceeds a specified number of years, a lower weight is assigned so that older yield data is modeled at lesser rate, and conversely more recently-collected data is modeled using a higher weight.

Additionally, the multi-year crop yield evaluation framework 100 may calculate and assign a weight for decay based on a degree of deviation of the precipitation value from a normal or average precipitation value, and on a degree of deviation of the temperature value from a normal or average temperature value, for a time period such as a collection year, growing season, or particular crop growth stage. The weight assigned to weather data 120 therefore represents decay that increases based on how far the precipitation and temperature values have deviated from normal values for the particular year or layer being analyzed. The weighting analysis applied for this weather variance may further account for different types of precipitation, such as rainfall and artificial precipitation from irrigation, and other weather values such as humidity and the like.

The multi-year crop yield evaluation framework 100 may further calculate a combined weighted value that reflects all weights for variables modeled in the image data 112, and in any other component of input data 110 utilized. Multiple approaches for arriving at a combined weighted value are contemplated within the present invention. For example, the combined weighted value may represent an average weight of the different weights applied to each of the variables. One or more statistical processes and/or other mathematical formulas may also be applied to determine the combined weights. Regardless, it is to be understood that a single weight reflecting all of the factors impacting crop yield for a particular year is devised out of the many different weights calculated for the various components making up the input data 110.

A weighting may also be assigned to each of the normalized coverage data 115 and the normalized uniformity data 116 based on a specific image in the one or more images from which a yield profile 145 is generated. Similarly, any other derived data may also be weighted in accordance with the specific image or images from which a yield profile 145 is obtained.

It is to be understood that the calculation and assignment of a combined weight representing all weights assigned to components of the input data may be the product of one or more analytical functions and mathematical processes performed in the multi-year crop yield evaluation framework 100, and may include many different approaches. For example, the present invention may analyze statistical probability models by applying one or more mathematical equations to the input data 110. Other mathematical formulas and processes may be applied, such as transfer functions to determine a best-fit for a series of data points, a regression analysis, or other approaches to summarize relationships between multiple variables to arrive a single combined weight.

When multi-year crop yield is analyzed within the framework 100 of the present invention using image data 112 as a replacement for yield event information, the image data 112 is incorporated in the same way as is a logged yield data event. The mathematical modeling functions performed on logged coverage data 115 and logged uniformity data 116 are also performed on information extracted from the one or more images within the image data 112 obtained for the particular bounded field 125. Additionally, the same weightings are applied from the different variables (coverage, uniformity, age, weather, etc.). As noted above, the present invention contemplates that additional weighting may be assigned based on the use of image data 112 itself. For example, it may be decided that any event that is based on information extracted from imagery 113 in the image data 112 may be assigned a lower (or higher) weighting then an equivalent logged yield data event. The present invention may also vary this weighting based on different crop/variety level of correlation with image data 112 to yield.

Image data 112 may also be incorporated within the multi-year crop yield evaluation framework 100 to clean yield data from a logged yield event to remove erroneous measurements, and to ensure accuracy in downstream applications of output data 150 from the multi-year crop yield analysis 102. Image data 112 may therefore be used as a method of testing yield event information, such as for example to determine if flow delays have been properly set for a grain yield monitor, or to calibrate two or more yield monitors in the same field. Erroneous measurements of a yield event, including machinery dynamics as grain moves through the harvester, may cause a flow rate for a grain yield monitor to become skewed, thereby introducing delays in activities such as harvest and storage of a crop. Image data 112 may be used as a tool for cleaning the yield event data 114 to ensure efficient operation of farm/field equipment and the like.

Other variables related to crop yield 114 may also be identified from image data 112, and therefore it is to be understood that the present invention contemplates that many other variables may be utilized in the multi-year crop yield evaluation framework 100. Likewise, it is to be understood that weights may be calculated and assigned to each of these variables, using many different mathematical formulas and analytical processes. Such additional input data may include crop-specific information, and examples of such crop-specific variables include density data that reflects crop or seed characteristics such as plant population, row spacing, planting depth, root zone penetration, and seed population. Other possible examples of crop-specific variables include elevation, the amount and rate of artificial precipitation applied, an amount time to maturity or harvest, length of a growing season, and the actual yield itself. Still other examples of crop-specific variables include crop canopy and soil conditions such as crop moisture, crop temperature, soil moisture, and soil temperature. Such crop-specific variables may also be extracted from imagery 113 and image data 112, for example, using a normalized difference vegetative index (NDVI) or other similar approach as noted above. It is to be understood, however, that such additional input data may be utilized in the present invention from other, non-imagery sources, and that variables representing such additional input data need not specifically be derived from imagery sources.

Additionally, crop-specific variables may be comprised of different characteristics that enable quantification of the variable based on interactions between genetic, environmental, and managerial components. For example, plant and seed genetics perform differently in different regions, such as tropical climates versus the Midwest of the United States, and therefore accounting for genetics-by-environment interactions may produce a variable weight that accurately reflects its impact on decay. Similarly, management actions may not be constant, as large fields and large agribusinesses that own many farms may experience different managerial actions from field to field within the same agro-economic farm, and actions applied to different varietals of the same crop may differ based on climate, elevation, water level, etc.

The additional input data in the multi-year crop yield evaluation framework 100 may also include further field-specific data derived from image data 112. As noted above, field-specific data 124 may comprise information defining a field boundary 126 or other coordinates of the bounded field 125. It is to be noted that the geographical location of the bounded field 125 may be derived from data defining a field boundary 126 or other coordinates 127, and that these may be likewise may be extracted and identified from image data 112 itself. In one embodiment, field-specific data 124 may also be represented using the one or more GPS data points 128, and the present invention may include components such as a GPS-enabled receiver as noted above, which correlates the image data 112 with the one or more GPS data points 128 in detected signals relative to the bounded field 125 and to compute the field's precise position on Earth (or, a desired portion thereof). The GPS-enabled receiver may thereby be used in conjunction with image data 112 to determine the geographical location of the field 125, or relevant sections of the field 125, using coordinates 127 in the GPS data points 128.

As noted above, yield event information may be missing, unavailable, incomplete, unreliable, or otherwise of little or no use in the multi-year crop yield analysis 102 performed by the multi-year crop yield evaluation framework 100 of the present invention. For example, some yield event information may be available for a particular field 125 in year t, but not a complete set of such data. In this case, the present invention may incorporate image data 112 to fill in the gap of incomplete data for the year t. The multi-year crop yield evaluation framework 100 is therefore able to apply image data 112 to determine and identify yield data 114 that is not present in available information for a year t, by applying a vegetation index to the image(s) to obtain a yield profile 145 for the particular field 125 based on at least one vegetation property, and normalizing the outcome to obtain the desired component of yield event information for the portion of year t that is not available. In such an embodiment, the multi-year crop yield evaluation framework 100 may also include evaluating available yield event information to determine what yield event data for year t is incomplete, prior to performing the analytical functions discussed herein in the multi-year crop yield analysis 102.

Conversely, existing yield event information that forms only part of a yield event may be used to calibrate image 112 to fill in the rest of the data that is not present. For example, if the available coverage data falls below 50% for a particular field 125, the present invention may select images in the image data 112 using the existing coverage data as a calibration for such yield event, and apply yield event information determined from the image data 112 to the missing coverage areas. It is to be understood that any threshold amount of available data may be used, and may be adjusted depending on other factors such as for example quality of existing yield event information and/or image data 112.

Output data 150 from the multi-year crop yield analysis 102 of the present invention is applied to a site-specific prescription mapping component 160 as noted above, which is configured to apply the output data 150 in a mapping function that enables crop advisors, growers, and other users to interpret multi-year yield data and yield variability for an understanding of input rates in every zone of a bounded field 125. Output data 150 may also be applied to other mapping functions, in one or more additional components, configured to generate specific types of maps. Output data 150 from the multi-year yield analysis 102 may also include crop yield analytics 152 such as yield stability 154, yield normalization 156, and mean relative yield 158. Output data 150 may alternatively comprise a single numerical value for each sector of a bounded field 125 for which a crop yield analysis is desired. Regardless, the output(s) 150 are used in one aspect of the present invention to create visualizations of prescription maps of the bounded field 125.

As noted above, an agronomic decision support tool 170 may be incorporated within the present invention that is configured to allow access to one or more automated processes for agricultural decision-making and recommendation-writing such as creating and defining management zones 162 from the multi-year crop yield analysis 102. The agronomic decision support tool 170 also enables customized user operation and selection of various attributes, such as input and/or selection of one or more of the variables, as well as available imagery 113. The agronomic decision support tool 170 includes a user interface that may default to the view with the highest prioritization, with the user option to select any of the other images that fall within the acceptable prioritization threshold.

Output data 150 from the multi-year crop yield evaluation framework 100 may be applied to the agronomic decision support tool 170, and as noted above the user is able to input and/or select one or more variables, and select images from the image data 112 to be used in place of other variables (as well as to define and select weights to be applied to such image data 112), to tune the output data 150. The user may also employ the agronomic decision support tool 170 to automatically define a set of management zones 162 that each have a specific yield potential. A management zone 162 may be defined for a seeding event, a fertilizer/nutrient treatment event, a chemical treatment event, a tillage event, and irrigation event, and for any other crop (or soil) activity for a bounded field 125. Management zones 162 may therefore be used in automated processes and/or by crop advisors, growers, and other users to determine variable-rate applications 180 in the bounded field 125 for these crop activities, and create seeding and other variable rate events based on those applications, as well as prepare recommendations for those events.

The agronomic decision support tool 170 may include a function enabling a user override 172. Such a user override 172 allows a user, for example a crop advisor, to assign specific weights to each variable in the input data 110, and perform other tasks such as select appropriate variables, and define prescription mapping attributes and coordinates of the bounded field 125 or portions of the bounded field 125, for finer crop yield analytics 152.

The agronomic decision support tool 170 may also be configured to generate site-specific prescription maps 160 for visual representation to users, for example on a graphical user interface, and users may be able to configure settings for, and view various aspects of, the multi-year crop yield analysis 102 using a display on such graphical user interfaces, and/or via web-based or application-based modules. Tools and pull-down menus on such a display (or in web-based or application-based modules) may also be provided to customize the input data 110, as well as to modify the weightings applied to the different selected variables in the input data 110 as noted above. In addition to desktop, laptop, and mainframe computing systems, users may access the agronomic decision support tool 170 using applications resident on mobile telephony, tablet, or wearable computing devices.

As suggested above, the agronomic decision support tool 170 also allows users to view specific analytical outputs generated by the multi-year crop yield evaluation framework 100. Crop advisors, growers, and other uses may view resulting products such as yield stability 154, yield normalization 156, and mean relative yield 158 using the agronomic decision support tool 170. Similarly, users can view displays of weightings calculated and manually adjust these as needed. Users may also be able to manually adjust the variables of crop yield information themselves to further fine-tune the resulting products, as well as the output prescription mapping 160, management zones 162, and variable rate applications and recommendations 180.

A user may assign specific weights to the plurality of variables using the agronomic decision support tool 170, whether derived from image data 112 or otherwise, to introduce further specificity into the multi-year yield analysis 102. A yield layer may be weighted in a default condition by how far off weather data was from a particular normality in the year it was collected, such as by looking at weather from that year against the 30-year normal (or any other benchmark), and the further off from the normal average, the lower the weight assigned to the yield layer. However, the user may assign a weight to the multi-year yield analysis 102 based on long-range weather predictions or worse/best case scenarios. The user may select what weather conditions he or she would like to favor (or apply the higher weighting to). The user may select a higher weighting to dry or wet conditions as well as hot or cold conditions, and not the default average conditions. The user may therefore weight weather differently based on the specific weather conditions experienced, and/or based on the varietal planted. For example, a higher weight may be assigned to a cold-weather, irregular El Niño-Southern Oscillation (ENSO), or where a yield represents a drought-tolerant crop varietal in a particular low-moisture weather condition.

The user override 172 may therefore also enable a user to specify an intended crop or varietal when calculating the weather variable weighting. In this case, the multi-year crop yield evaluation framework 100 is configurable to weight yield layers with similar crops or varieties with a higher weight than yield layers not sharing similar parameters. As an example of this override 172, assume that a corn crop performs better in dryer conditions than a soybean crop. The weather variable may be assigned a weight to favor the dryer conditions for corn, and normal for soybeans. In a further example, if it is known that a given variety of corn prefers colder weather, weather may be weighted higher to favor previous years based on previous plantings that included colder weather varietals.

These expected or normal values, as with age data, may be dependent on a number of other factors, such as the type of crop planted and/or product harvested. For example, if the yield data 114 is related to a crop that is capable of withstanding a wider temperature range, a different weight may be assigned than for a crop that is more sensitive to temperature variation. Similarly, if the yield data 114 is related to a crop that requires less water, a different weight may be assigned than for a crop that requires more water. The same is true for soil conditions in the bounded field 125, so that weights calculated and assigned based on weather conditions may vary depending on soil conditions in the bounded field 125, as different types of soil, and the various contents and characteristics of soil, may result in crop yields with different temperature and precipitation variances. Soils may have markedly different characteristics in different parts of the same bounded field 125 as well, and it is to be understood that the weights calculated and assigned to weather conditions may further take this into account.

As noted above, weights that account for weather conditions (and for uniformity, coverage, and age data) may also assigned according to a varietal of a planted crop. In this manner, weightings may be influenced and refined by specifics of the crop, so that a different weighting may result where a certain varietal was planted in particular weather conditions. Weightings based on crop varietals may therefore results in a weighting-of-weightings approach that produces a highly refined analysis of the crop yield based on specific characteristics of the crop. It should be noted that weights may be further refined by other crop-specific variables, such as where a particular nutrient or chemical was applied to mitigate a known pest or disease threat. Many other such considerations are possible when assigning weights within the multi-year crop yield evaluation framework 100 of the present invention.

Many other elements or embodiments are possible and are within the scope of the present invention. For example, the input data 110 may also include in-situ or ground truth observations that collect and analyze yield event information during a growing season, for a comparison analysis to historical crop yield data from prior growing seasons. This comparison data may be incorporated in the calculation and assignment of weights for the variables comprising crop yield information, and may also be incorporated as a means of confirming or checking the information determined and identified from image data 112. Yield event information from the current growing season may be useful to modulate data from prior growing seasons in a comparison analysis, for example to account for different crop treatments that have already been applied, and to account for up-to-the-minute crop, soil and field conditions.

Site-specific prescription mapping 160 in the multi-year crop yield evaluation framework 100 may be used for developing, as noted above, variable-rate applications 180 for the bounded field 125. Variable-rate applications 180 include a variable-rate seeding application 181 to assist a grower in determining a rate or rates for seeding the bounded field 125 for one or more crops. Variable-rate applications 180 may also include a variable-rate fertilizer/nutrient application 182 to assist the grower in determining a fertilizer or other nutrient application rate for different areas of the bounded field 125. Similarly, outputs of variable rate applications 180 are possible for chemical applications 183, irrigation applications 184, tillage 185, and other crop treatments 186, such as for example pesticides, herbicides, biological treatments, and the like.

Variable rate applications 180 may also related to type, timing, and volume of equipment usage for seeding and other agricultural activities the bounded field 125, and therefore variable-rate applications 180 may be tailored to provide specific information for a bounded field 125. For example, crop advisors, growers and other uses may apply the outputs of the multi-year crop yield evaluation framework 100 to adjust a timing, volume, location and type of irrigation applied to different sectors of a bounded field 125 under particular weather conditions. Similarly, the outputs of the multi-year crop yield evaluation framework 100 may be applied to inform tillage activities in different sectors of the bounded field 125, and determine specific agricultural equipment to be used at particular times and under particular conditions. The agronomic decision support tool 170 may be configured to generate many different types of recommendations for these variable rate applications 180 for the user to apply to the bounded field 125.

Other recommendations 180 are also possible from the output data 150. For example, a regulatory recommendation may be generated for compliance with local, state, or federal regulations related to a variable-rate application of a crop treatment 186. In another example, a regulatory recommendation may be generated following a variable-rate application of a type or quantity of artificial precipitation applied to a crop or field. Accordingly, the present invention may be configured to generate many kinds of field-specific and crop-specific recommendations related to variable-rate applications 180 as outcomes of the multi-year crop yield analysis 102 within the framework 100.

It is to be further understood that the present invention may also be embodied in a software package, library, or other software-oriented component that provides all of the same functions within the multi-year crop yield evaluation framework 100 as described above. Alternatively, the present invention may be embodied in a hardware package, module, circuit board, chip, component, or other electronic hardware-oriented system that also provides all of these same functions. Such software and hardware each have multiple components capable of retrieving the data items necessary for practicing the present invention, and their timely updates. They also have multiple components capable of specifically performing the multi-year crop yield analysis 102, site-specific prescription mapping 160, and the variable rate application recommendation writing aspects of the present invention.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, non-transitory or otherwise, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the multi-year crop yield evaluation framework 100 of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
  receiving, as input data, remotely-sensed imagery data representing one or more portions of a bounded field;
  analyzing the input data in one or more data processing modules within a computing environment in which the plurality of data processing modules are executed in conjunction with at least one processor, the one or more data processing modules configured to initialize one or more recommendations for a variable rate application for the bounded field based on a multi-year yield analysis of yield event information derived from the remotely-sensed imagery data, the multi-year yield analysis performed by developing an agricultural model of crop yield for determining at least one variable-rate crop treatment for the bounded field, by
  1) selecting one or more images from the remotely-sensed imagery data that represents a crop for which yield event information is sought in the bounded field over a desired prior period of time,
  2) selecting an appropriate vegetation index based at least on the crop for which yield event information is sought,
  3) applying the vegetation index to the one or more images to analyze at least one vegetation property of the crop and generate a yield profile representing a yield approximation for the crop, 4) normalizing the yield profile to represent at least one of a percentage of the bounded field that is covered by the crop as yield coverage data, and a variation factor in the crop yield across the bounded field as yield uniformity data, and 5) combining the assigned weights for the at least one of the yield coverage data and the yield uniformity data into a single weighted value representing the yield event information;

generating, as output data, one or more site-specific prescription maps of the crop yield in the bounded field based on the multi-year yield analysis; and initiating at least one variable-rate crop treatment in the bounded field, wherein a user performs the variable-rate crop treatment according to one or both of the one or more site-specific prescription maps of the crop yield or the multi-year yield analysis, or an automated at least one variable-rate crop treatment is controlled according to one or both of the one or more site-specific prescription maps of the crop yield or the multi-year yield analysis.

2. The method of claim 1, further comprising assigning a weight for the yield coverage data that represents decay at a rate beginning at a 90% coverage factor and approaching zero at a point between a 35% to 65% coverage factor.

3. The method of claim 1, further comprising assigning a weight for the yield uniformity data that represents decay at a linear rate starting between at an 80% uniformity factor and approaching zero at a 10% uniformity factor.

4. The method of claim 1, further comprising receiving additional input data representing an age of the crop yield, and assigning a weight for the age of the crop yield based on a collected age of the yield event when a total number of yield events exceeds a specified number of years.

5. The method of claim 1, further comprising receiving additional input data representing weather information for the bounded field, and assigning a weight for the weather information that represents increasing decay as a precipitation value deviates further from a normal precipitation value, and as a temperature value deviates further from a normal temperature value.

6. The method of claim 1, further comprising assigning an additional weight to the at least one of the yield coverage data and the yield uniformity data based on at least one specific image in the one or more images from which the yield profile was generated.

7. The method of claim 1, further comprising automatically defining a set of management zones, each management zone having a specific yield potential.

8. The method of claim 7, further comprising generating one or more recommendations for a variable rate application for the bounded field for the set of management zones.

9. A system, comprising:

a computing environment including at least one non-transitory computer-readable storage medium having program instructions stored therein and a computer processor operable to execute the program instructions to initialize one or more recommendations for a variable rate application for a bounded field based on a multi-year yield analysis of yield event information derived from remotely-sensed imagery data by developing an agricultural model of crop yield for determining at least one variable-rate crop treatment for the bounded field within one or more data processing modules, the one or more data processing modules including:

an image selection component configured to select one or more images from the remotely-sensed imagery data that represents a crop for which yield event information is sought in the bounded field over a desired prior period of time;

a vegetation evaluation component configured to select an appropriate vegetation index based at least on the crop for which yield event information is sought, and apply the vegetation index to the selected one or more images to analyze at least one vegetation property of the crop and generate a yield profile representing a yield approximation for the crop, a data conversion component configured to a) normalize the yield profile to represent a percentage of the bounded field that is covered by the crop as yield coverage data, and a variation factor in the crop yield across the bounded field as yield uniformity data, b) assign weights for at least one of the yield coverage data and for the yield uniformity data, c) combine each assigned weight into a single weighted value representing the extracted yield event information, and d) assign a further weight to the at least one of the yield coverage data and the yield uniformity data based on a specific image in the one or more images from which the yield profile was generated;

a mapping component configured to generate one or more site-specific prescription maps of the crop yield in the bounded field based on the multi-year yield analysis; and an output data component configured to initiate at least one variable-rate crop treatment in the bounded field, wherein a user performs the variable-rate crop treatment according to one or both of the one or more site-specific prescription maps of the crop yield or the multi-year yield analysis, or an automated at least one variable-rate crop treatment is controlled according to one or both of the one or more site-specific prescription maps of the crop yield or the multi-year yield analysis.

10. The system of claim 9, wherein the data conversion component is further configured to assign a weight to input data representing an age of the crop yield based on a collected age of the yield event when a total number of yield events exceeds a specified number of years.

11. The system of claim 9, wherein the data conversion component is further configured to assign a weight to weather information that represents increasing decay as a precipitation value deviates further from a normal precipitation value, and as a temperature value deviates further from a normal temperature value.

12. The system of claim 9, wherein the weight assigned for the yield coverage data represents decay at a rate beginning at a 90% coverage factor and approaching zero at a point between a 35% to 65% coverage factor.

13. The system of claim 9, wherein the weight assigned for the yield uniformity data represents decay at a linear rate starting between at an 80% uniformity factor and approaching zero at a 10% uniformity factor.

14. The system of claim 9, wherein the one or more site-specific prescription maps are applied to automatically define a set of management zones, each management zone having a specific yield potential, and to generate one or more recommendations for a variable rate application for the bounded field for the set of management zones.

15. A method of performing a multi-year yield analysis in precision agriculture, comprising:

retrieving and initializing a plurality of input data, the plurality of input data including remotely-sensed imagery data representing one or more portions of a bounded field;

developing an agricultural model of crop yield for determining at least one variable-rate crop treatment for the bounded field;

identifying one or more images from the remotely-sensed imagery data that represents a crop for which yield event information is sought in the bounded field over a desired prior period of time;

deriving a yield profile representing a yield approximation for the bounded field by analyzing the one or more images using at least one vegetation index selected based on one or more vegetation properties of the crop for which the yield event information is sought;

normalizing the yield profile to represent a percentage of the bounded field that is covered by the crop as yield coverage data, and a variation factor in the crop yield across the bounded field as yield uniformity data;

calculating a weight for each of the yield coverage data and the yield uniformity data, the weight of the yield coverage data representing decay at a rate beginning at a 90% coverage factor and approaching zero at a point between a 35% to 65% coverage factor, and the weight of the yield uniformity data representing decay at a linear rate starting between at an 80% uniformity factor and approaching zero at a 10% uniformity factor; and initiating at least one variable-rate crop treatment in the bounded field, wherein a user performs the variable-rate crop treatment based on the multi-year yield analysis, or an automated at least one variable-rate crop treatment is controlled based on the multi-year yield analysis.

16. The method of claim 15, further comprising calculating a combined weight from the weights calculated for each of the yield coverage data and the yield uniformity data representing a single weighted value for the yield event information for the crop in the bounded field.

17. The method of claim 15, further comprising calculating an additional weight for each of the yield coverage data and the yield uniformity data, based on at least one specific image in the one or more images from which the yield profile was generated.

18. The method of claim 15, further comprising mapping the crop yield in one or more site-specific prescription maps in the bounded field.

19. The method of claim 18, further comprising automatically defining a set of management zones from the one or more site-specific prescription maps, each management zone having a specific yield potential.

20. The method of claim 19, further comprising generating one or more recommendations for a variable rate application for the bounded field for the set of management zones.

* * * * *